April 22, 1924.
F. H. MACE
LEVER CATCH
Filed March 31, 1923
1,491,717
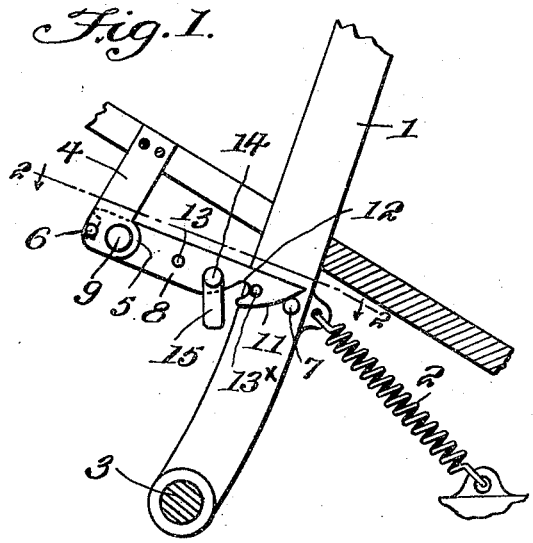
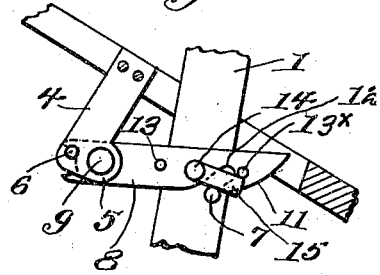
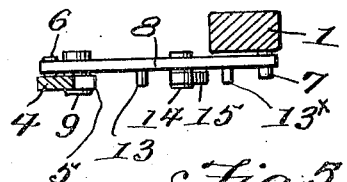
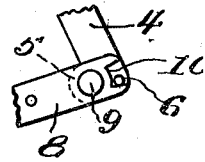
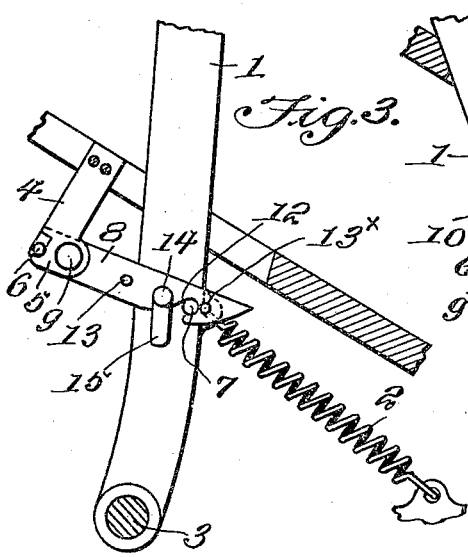
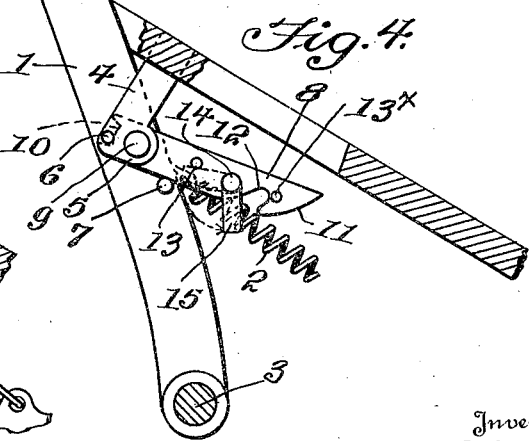
Inventor
Frank H. Mace
Witnesses
By Victor J. Evans
Attorney Patented Apr. 22, 1924.

1,491,717

UNITED STATES PATENT OFFICE.

FRANK H. MACE, OF MEDINA, NEW YORK, ASSIGNOR OF ONE-HALF TO LESLIE T. BASINAIT, OF ALBION, NEW YORK.

LEVER CATCH.

Application filed March 31, 1923. Serial No. 629,047.

*To all whom it may concern:*

Be it known that I, FRANK H. MACE, a citizen of the United States, residing at Medina, in the county of Orleans and State of New York, have invented new and useful Improvements in Lever Catches, of which the following is a specification.

The object of my said invention is the provision of a simple, conveniently operated and safe lever catch adapted when the lever is moved in one direction to automatically catch and hold the lever against retrograde movement, and also adapted when the lever is further moved in the same direction to automatically release the lever and permit the same to move in reverse direction back to its original position.

My novel catch is designed more particularly, though not necessarily, for use in association with the clutch pedal lever of an automobile.

To the attainment of the foregoing, the invention consists in the improvement as hereinafter described and definitely claimed.

In the accompanying drawings, forming part of this specification:—

Figure 1 is a side elevation showing the clutch pedal or foot lever as it appears prior to being moved forwardly to any extent.

Figure 2 is a horizontal section taken through the lever in the plane 2—2 of Figure 1 above the catch.

Figure 3 is a view showing the lever engaged with the catch after the first forward movement of the lever.

Figure 4 is a similar view illustrative of the manner in which following further forward movement of the lever and the release thereof, the lever moves back to its original position.

Figure 5 is a detail elevation illustrating the opposite side of the lever to that shown in Figure 1.

Figure 6 is a detail showing how the lever moves back to the position of Figure 1 without being engaged by the catch.

Similar numerals of reference designate corresponding parts in all of the views of the drawings.

The lever 1 is subject to retraction by an appropriate spring 2, and is hingedly connected and supported at its lower end as indicated by 3.

Appropriately supported in proper relation to the lever 1 is a standard 4 to which is fixed an arm 5 having at 6, Figure 5, a stop.

The lever 1 is provided with a lateral pin 7, and a gravitational catch 8 is pivoted at 9 to the arm 5 and is arranged in parallelism with the line of movement of the lever 1.

Figure 5 shows clearly that in the preferred embodiment of my invention one end of the catch 8 is bifurcated as indicated by 10 to receive the stop 6, and to enable the lower arm of the bifurcation to bring up against the stop 6 with a view to limiting the downward movement of the beveled end 11 of the catch 8. In addition to the beveled end 11 the catch 8 is provided with an inclined notch 12 and a stop 13.

Pivotally connected at 14 to the catch 8 is a gravitational guard 15, which is normally pendent on the catch 8 as illustrated in Figure 1.

In the practical operation of my improvement it will be readily understood that when the lever 1 is moved a short distance toward the left in Figure 1, the pin 7 will raise the catch 8, and the said pin 7 will be seated in the notch 12 of the catch with the result that the lever 1 will be safely held against retrograde movement. It will also be manifest that on further movement of the lever 1 toward the left the pin 7 will raise and pass the guard 15, whereupon the lever will be moved backward by the spring 2 and will ride under and raise the guard 15, the said guard 15 at that time bringing up against an additional stop 13ˣ on the catch 8. From this it follows that the catch 8 will not interfere in any measure with the return movement of the lever 1 subsequent to the forward movement of the lateral pin 7 beyond and out of engagement with the gravitational guard 15.

Notwithstanding the practical advantages ascribed to my novel catch it will be noted that the catch is simple and inexpensive in construction and is well adapted to withstand the usage to which devices of corresponding character are ordinarily subjected.

I have entered into a detailed description of the construction and relative arrangement of the parts embraced in the present and preferred embodiment of my invention in order to impart a full, clear, and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters Patent, is:—

The combination of a lever having a lateral pin, an appropriately supported standard having an arm and a stop thereon, a gravitational catch pivoted to said arm and having a bifurcated end for cooperation with said stop and also having an opposite beveled end and a notch adjacent thereto and lateral stops, and a normally pendent guard pivoted to the catch at the opposite side of the notch to the beveled end and movable by the lateral pin within the limit determined by the said stops on the catch.

In testimony whereof I affix my signature.

FRANK H. MACE.